(12) United States Patent
Huang

(10) Patent No.: US 6,384,815 B1
(45) Date of Patent: May 7, 2002

(54) AUTOMATIC HIGHLIGHTING TOOL FOR DOCUMENT COMPOSING AND EDITING SOFTWARE

(75) Inventor: Andrew J. Huang, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/256,636

(22) Filed: Feb. 24, 1999

(51) Int. Cl.[7] .............................................. G08C 21/00
(52) U.S. Cl. ...................... 345/179; 345/182; 178/18.03
(58) Field of Search .................................. 345/179–183, 345/16; 178/18.01, 18.02, 18.03, 18.04, 18.05

(56) References Cited

U.S. PATENT DOCUMENTS

| | | | | |
|---|---|---|---|---|
| 5,142,161 A | * | 8/1992 | Brackmann | 235/462.49 |
| 5,475,401 A | * | 12/1995 | Verrier et al. | 178/18.03 |
| 5,796,866 A | * | 8/1998 | Sakurai et al. | 382/187 |
| 5,862,256 A | * | 1/1999 | Zetts et al. | 382/187 |
| 5,867,150 A | * | 2/1999 | Bricklin et al. | 345/173 |
| 5,982,370 A | * | 11/1999 | Kamper | 345/760 |

FOREIGN PATENT DOCUMENTS

WO     WO99/28812    *   6/1999

* cited by examiner

Primary Examiner—Richard Hjerpe
Assistant Examiner—Kevin M. Nguyen

(57) ABSTRACT

In connection with an electronic reading/annotation device, a method for automatically selecting between an electronic writing pen tool used for handwriting tasks and an electronic marker tool used for highlighting tasks is provided. Whereas handwriting normally consists of small radius curves, and frequent changes of direction, highlighting strokes are normally long and smooth with hardly ever a change of direction. The automatic selection method utilizes analysis of the shape of each stroke. More specifically, the length of each stroke is calculated between a starting point and a later made point of the stroke. If the length of the stroke is close to that of a straight line between the same two points and the stroke is determined not to be a handwriting stroke, the highlighting function is automatically selected. The exact determination of "close" is a tunable parameter. In order to make the automatic selection process seemingly instantaneous, comparison of actual stroke length to straight-line length is made on the fly. That is, the calculation commences as each new beginning stroke point is created, rather than at the end of each stroke. In order to make the automatic selection process more robust, two other enhancements are made. Firstly, to eliminate straight strokes used in handwriting, computation of stroke length is delayed until stroke distance has exceeded a set number of pixels. This feature recognizes the fact that handwriting includes many short, nearly-straight line sections, and that often, a written word may begin with such a section. Secondly, in order to prevent the online algorithm from needlessly flip-flopping between the pen and marker tools at the beginning of a stroke, the algorithm begins with the pen tool selected and maintains that setting until the algorithm may decide that the other setting is more appropriate.

21 Claims, 3 Drawing Sheets

AUTOMATIC HIGHLIGHTING TOOL FOR DOCUMENT COMPOSING AND EDITING SOFTWARE

FIELD OF THE INVENTION

This invention relates to software tools for composing and editing documents. More particularly, it relates to methods, based on analysis of user inputs, for automatically selecting such tools.

BACKGROUND OF THE INVENTION

While working with a paper document, a reader typically interacts with the document in two ways: 1) A narrow-point pen can be used to make handwritten notes in margins; and 2) a wide-tip highlight marker can be used to accentuate important text. A serious reader will generally have both tools at his disposal. In order to support this kind of interaction in an electronic reading/annotation device, a user is generally provided with a variety of editing tools (pens of various colors, highlighters, erasers, etc.), as well as a means of selectively activating one of those tools. Although a wide variety of tools may be available, most users will chose to interact almost exclusively with either a plain pen tool or a highlighter tool.

The most convenient type of electronic reading/annotation devices has a touch-pad combined with a display screen. Generally, the screen is a liquid-crystal display (LCD). Using a writing stylus provided with the unit, the user/reader may draw or write directly on the screen. The path of the stylus point on the screen may be recorded as a bit-mapped image. Alternatively, handwritten text may be converted to ASCII characters, and ASCII text, which the user desires to make prominent, may be tagged with a highlighting attribute.

Touch-pad display screens have found wide application in Personal Digital Assistants (PDAs), ultra-compact personal computers, with built-in operating systems, that are optimized for scheduling and other high-mobility operations. During the past several years, the popularity of PDAs has soared. Corporations such as Sharp, Casio, Philips, 3-Comm, and Hewlett-Packard have entered the fray. Most have flash memory, a small liquid-crystal-display touch-pad screen, a user input device which may be either a barely-usable, miniature keyboard, and/or a touch pad incorporated into the screen, as well as a communications port for transferring files between the PDA and a less-portable computer. A high-end PDA may incorporate a modem and communications software, as well as drawing, word-processing and spreadsheet software. A writing stylus, or "pen", may be supplied, with which the user may write and draw on the touch-pad screen. The touch-pad feature has great utility on a PDA, as nearly all PDAs are too small to incorporate a keyboard that is large enough for touch typing. Thus, handwriting and drawings are stored as bit-mapped patterns. With writing recognition software that is supplied with many of the PDAs, a user's handwriting can be converted to ASCII text. Compared with desk-top and lap-top computer systems, PDAs generally have very limited memory storage capabilities. However, the average amount of memory being supplied with PDAs is growing rapidly. Already, PDAs with 16 megabytes of flash memory are available. As it becomes possible to load an entire novel or textbook into the memory of a PDA, it is likely that they will find wide use as electronic editing and annotation devices.

Lap-top computers are equipped, almost exclusively, with LCD displays. Within the past year, flat screen displays utilizing LCD technology have become sufficiently inexpensive that they are beginning to replace cathode-ray-tube (CRT) displays used with desk-top systems. Because touch-pad functionality can be readily incorporated in an LCD display, it is likely that large numbers of both lap-top and desk-top systems will soon incorporate touch-pad functionality. With the availability of such systems, electronic editing and annotating of documents will become much more widespread.

What is needed is an automatic writing tool selection system for an electronic reading/annotation device that will eliminate the need for a user to explicitly select either a writing pen function or a highlighter marker function from a pallet of available graphic composition tools. The system should be fine tunable so as to better adapt to a particular user's writing style, as well as to his editing and annotating needs. Additional desired features are that the selection process will be dynamic, and that highlighting strokes will be neatly redrawn by the system.

SUMMARY OF THE INVENTION

This invention constitutes a method, employable in connection with an electronic reading/annotation device, for automatically selecting between an electronic writing pen tool used for handwriting tasks and an electronic marker tool used for highlighting tasks. Whereas handwriting normally consists of small radius curves, and frequent changes of direction, highlighting strokes are normally long and smooth with hardly ever a change of direction.

The automatic selection method utilizes analysis of the shape of each pen stroke. More specifically, the length of each pen stroke is calculated dynamically between its starting and a later made point. If the length of the stroke is close to that of a straight line between the same two points and the stroke is longer than a typical handwriting stroke, the highlighting function is automatically selected. The exact determination of "close" is a tunable parameter. Empirically, it has been determined that a stroke distance less that 110% of the straight-line distance serves well for the selection of the highlighting function.

In order to make the automatic selection process seemingly instantaneous, comparison of actual stroke length to straight-line length is made online, or on the fly. That is, the calculation commences as each new beginning stroke point is created, rather than offline at the end of each stroke.

An additional requirement may be placed on the user-made stroke before the highlighting function is selected. As a general rule, highlighting follows the lines of displayed text. As text is almost always displayed in a format consisting of horizontal lines, highlighting will normally follow one or more lines. However, some users may opt to place one or more vertical strokes before or after multiple lines of text as a highlighting shortcut. This is especially true if the use desires to highlight large sections of text. Thus, the user will normally intend that highlighting strokes be either horizontal or vertical, with respect to the display screen. As an additional enhancement to the selection method, highlighting strokes are conformed so that they are either perfectly horizontal or perfectly vertical.

In order to make the automatic selection process more robust, three other enhancements are made. Firstly, a determination as to whether or not the stroke is meant to be a straight line is delayed until straight-line distance has exceeded a set number of pixels. This feature recognizes the fact that handwriting includes many short, nearly-straight line sections, and that often, a written word may begin with such a section. Secondly, in order to prevent the online algorithm from needlessly flip-flopping between the pen and marker tools at the beginning of a stroke, the algorithm begins with the pen tool selected. The rationale for always starting with the writing pen is that it is the most commonly used writing tool.

Although the invention may be practiced most conveniently with an electronic stylus and a touch-pad screen, the invention may be employed with any pointing device, such a mouse, a trackball, or a touch-pad.

DETAILED DESCRIPTION OF THE INVENTION

Figure 1:
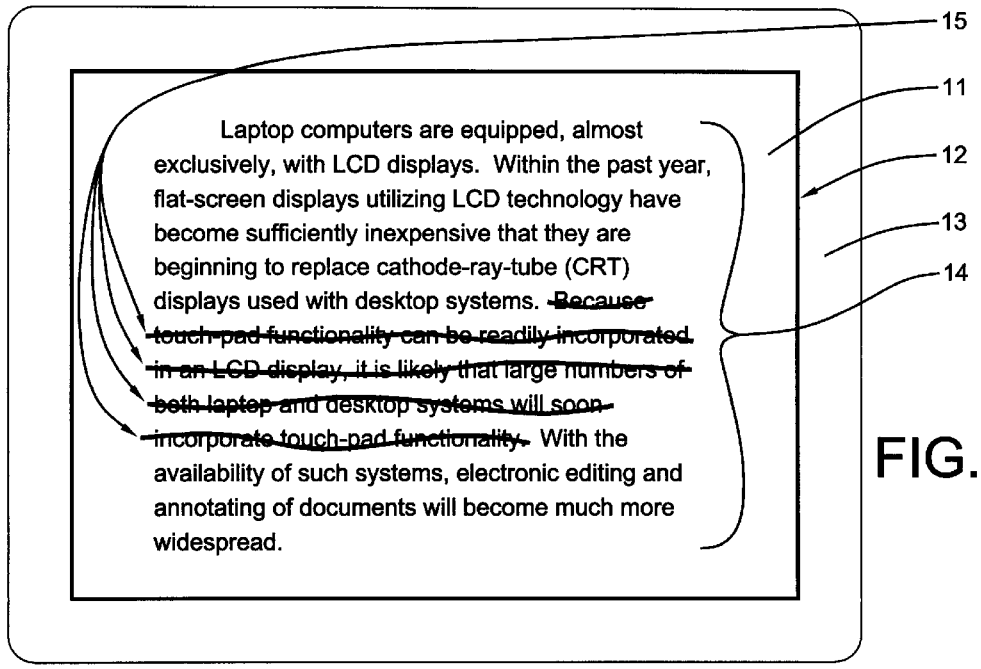
FIG. 1 is a graphic representation of sample text electronically displayed on a flat, touch-screen display, a portion of said text having been subjected to highlighting strokes.

Electronic devices for reading, editing and annotating documents have a digital semiconductor memory into which a document may be loaded, and a display screen on which a document, or a portion thereof, may be displayed. Those reading/editing/annotating devices which are user-friendly incorporate a touch-pad feature which allows a trace, made on the surface of the screen with an electronic stylus, to be stored as a bit-mapped image. The touch-pad feature may be readily incorporated in a flat-panel screen, such as a liquid-crystal matrix display. Generally, a pallette of electronic writing and editing tools, which includes a writing pen and a highlighting marker, is made available to the reader. This invention constitutes a method for automatically selecting between an electronic writing pen tool used for handwriting and/or drawing tasks, such as appending notes to the document and placing editing marks on the text, and an electronic marker tool used for text highlighting tasks. Although the method may be employed with any pointing device, such as a mouse, a trackball, or a touch pad, anyone who has attempted to handwrite text using a mouse or a trackball in combination with a computer-aided drafting program will realize that the use of an electronic stylus on a touch-pad display screen is far less awkward.

The automatic selection makes use of the observation that handwriting normally consists of small radius curves, with frequent changes of direction. Highlighting strokes, on the other hand, are normally long and smooth with hardly ever a change of direction. The shape of each user stroke, whether made by an electronic stylus or other pointing device, is analyzed by a selection algorithm. Each stroke has a beginning point and an end point. The length of each pen stroke is calculated between its beginning and ending points. If the length of the stroke is close to that of a straight line between the same two points, it is assumed that the user is executing a highlighting operation, and the highlighting function is automatically selected. The exact determination of "close" is a tunable parameter. Empirically, it has been determined that a stroke distance less that 110% of the straight-line distance serves well for the selection of the highlighting function.

An additional requirement may be placed on the user-made stroke before the highlighting function is selected. As a general rule, highlighting follows the lines of displayed text. As text is almost always displayed in a format consisting of horizontal lines, highlighting will normally follow one or more lines. Some users may opt to place one or more vertical strokes before or after multiple lines of text. This is especially true if the user desires to highlight large sections of text. Thus, the user will intend that highlighting strokes be either horizontal or vertical, with respect to the display screen. As an additional enhancement to the selection method, highlighting strokes are conformed so that they are either perfectly horizontal or perfectly vertical. If horizontal, the conformation process centers them on the text lines. Tolerance for verticality or horizontality may be adjustably set. However, a tolerance of about five degrees from true verticality or true horizontality is deemed to be a reasonable tolerance.

In order to make the automatic selection process seemingly instantaneous, comparison of actual stroke length to straight-line length is made online, or on the fly. That is, the calculation commences as each new beginning stroke point is created, rather than offline (i.e., at the end of each stroke). Thus, the calculation is made from the first point of the stroke to a point which is not the end point, but which is sufficiently distant from the first point so that the user's intention is ascertained before the stroke is complete.

In order to make the automatic selection process more robust, two other enhancements are made. Firstly, determination of whether or not linearity of the stroke is intended is delayed until the straight-line distance has exceeded a set number of pixels. This feature recognizes the fact that handwriting includes many short, nearly-straight line sections, and that often, a written word may begin with such a section. Secondly, in order to prevent the online algorithm from needlessly flip-flopping between the pen and marker tools at the beginning of a stroke, the writing pen tool is initially selected. The rationale for always starting with the writing pen is that it is the most commonly used writing tool. Alternatively, either tool, once selected, is retained until the algorithm determines that the other tool is intended. The rationale for maintaining the already selected writing tool to begin the next stroke is that certain operations, such as highlighting, may require multiple strokes for the highlighting of multiple consecutive lines. Likewise, once the writing pen is selected, the user intends to write multiple letters which require multiple strokes.

Referring now to FIG. 1, a paragraph of sample text 14 is electronically displayed on a flat, touch-screen display 11. The display 11 is surrounded by an enclosure 13 having a frame-like window 12. A portion of the displayed text 14 has been subjected to five strokes 15, which highlight the third sentence of the displayed paragraph. The strokes have been made with some type of pointing device, whether it be a mouse, a trackball, a touch-pad pointer, a specially-designed stylus or the point of the user's finger moved across the surface of the screen. It will be noted that none of the five strokes is a perfectly straight line. Although perfectly straight lines are only geometric abstractions, it is evident that the user intended that the strokes be superimposed on the lines of text which constitute the third sentence of the paragraph. If only a small portion of each stroke is analyzed, the direction and intended linearity of the stroke are also apparent. This fact makes it possible to select the appropriate writing/marker tool on the fly (i.e., before the stroke is complete). Once the highlight marker tool is selected, it clearly makes sense to retain the selected tool to begin subsequent strokes until such time as an empirical determination is made that a different tool is intended. Although the individual strokes are not perfectly linear, they may be conformed as such. The conformation process may also center individual highlighting strokes on their associated text line. As it might appear to the user, as soon as the highlight marker tool is selected, the highlight function may change the color of a stripe of the screen, which is behind and centered on the text line, from the default screen color to one which has been designated for highlighting functions.

Figure 2:
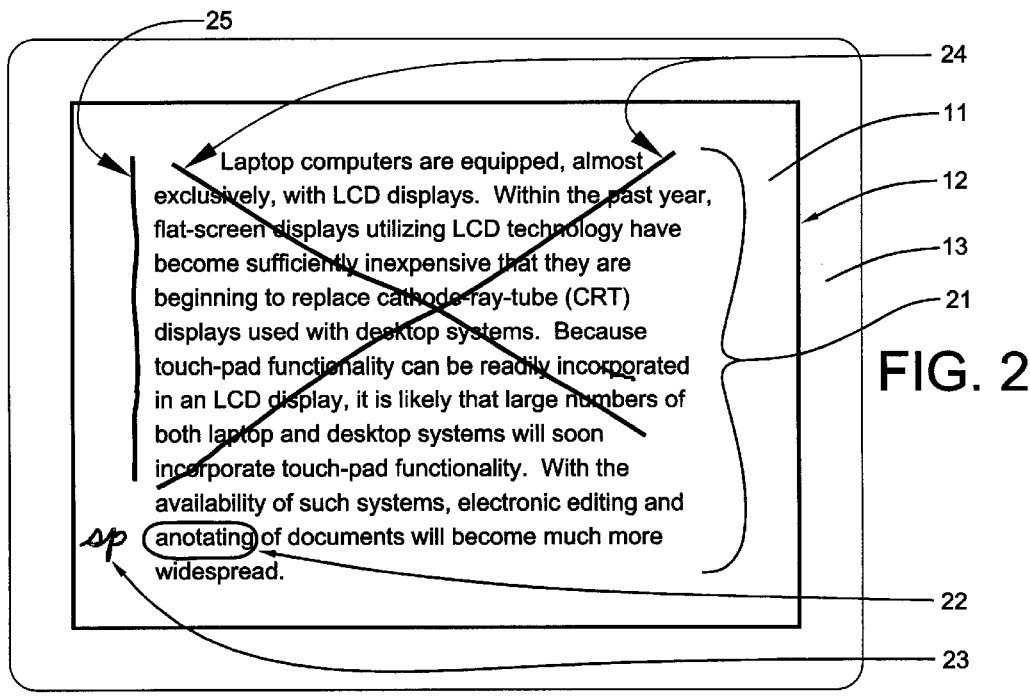
FIG. 2 is a graphic representation of text similar to that of FIG. 1, said text having a vertical highlighting stroke, a crossed-out section of text, and a misspelled word of which has been encircled and identified in the left-hand margin by the handwritten letters "sp"

The text displayed on the screen 11 of FIG. 2 is identical to that of FIG. 1, with the exception that the word "annotating" has been misspelled. The user has made a number of strokes. The first 22 is a stoke which encircles the misspelled word. This was not intended to be a highlighting stroke, although the upper and lower portions of that stroke are nearly linear. However, as the linear portions are not centered on the text, they may be distinguished from a highlighting stroke. The handwritten text "sp" 23 indicates that the encircled word is misspelled. The strokes required to form the handwritten letters have mostly curved sections. Only the letter "p" has one or two short sections which approach linearity. Nevertheless, the portions which approach linearity are sufficiently short that the selection algorithm can be adapted to ignore such sections. The handwritten letter "s" begins with a curved, almost diagonal, up-stroke, which would identify the stroke with the pen tool almost immediately. The nearly linear, nearly vertical strokes in the letter "p", which follow, will be ignored, as the selection of the pen tool has already been made, the pointer device has not been lifted from the screen surface 11 to begin a new stroke, and the selection algorithm may be designed to prevent selection of the highlighter tool when nearly linear portions of a stroke have a length less than a fixed amount.

Still referring to FIG. 2, a pair of intersecting nearly linear strokes 24 have been placed through the first ten lines of text. These lines are intended to cross out the first ten lines of text. The writing tool is probably the most appropriate selection for that purpose. However, the nearly vertical, nearly linear stroke 25 is a highlighting stroke meant to accentuate the entire displayed paragraph. The tool selection algorithm will recognize this stroke as a highlighting stroke because of both its length, its near linearity, and its near verticality.

Figure 3:
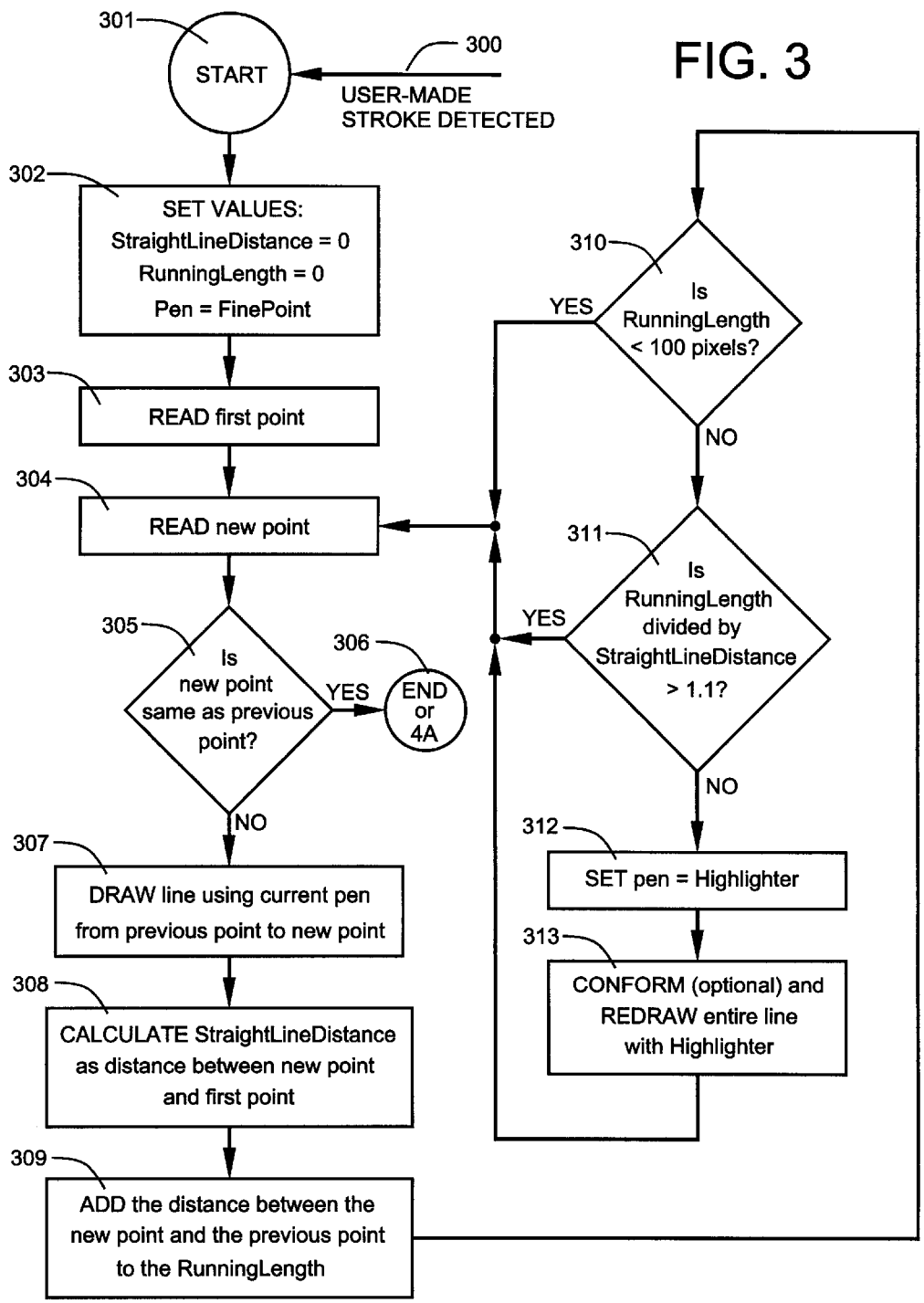
FIG. 3 is a first portion of a flow chart detailing the steps of the automatic tool selection method.
Figure 4:
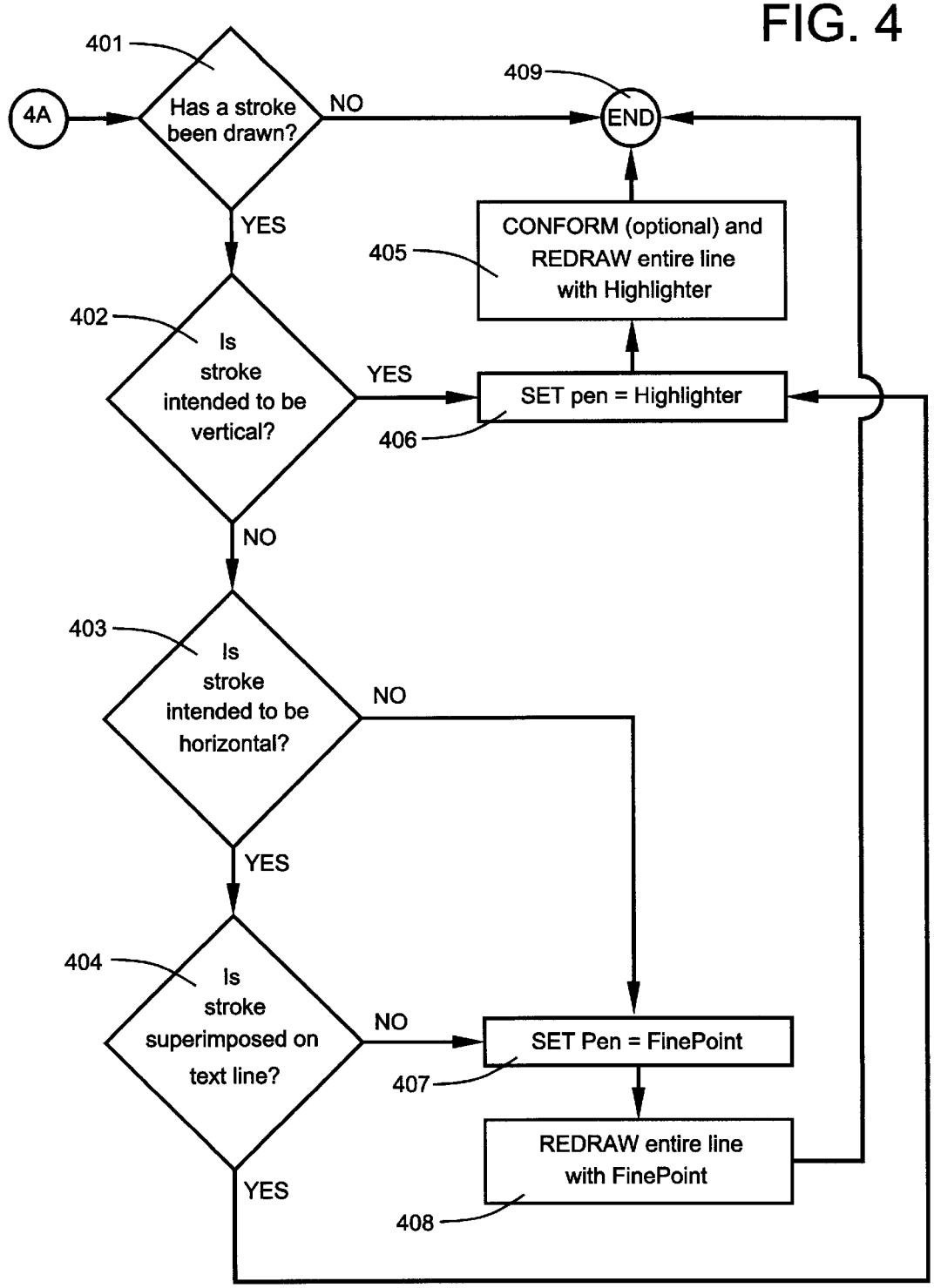
FIG. 4 is a second portion of a flow chart detailing the steps of the automatic tool selection method.

The combination of FIGS. 3 and 4 constitute a logic flow chart which established a currently preferred embodiment of the steps which are employed to implement the pen/marker tool selection process. The basic selection algorithm is shown in FIG. 3. Enhancements to the algorithm are depicted in FIG. 4. Start algorithm 301 is invoked when the system detects that a user-made stroke 300 has been initiated by a pointing device resident on the reading/annotating device system, which may include specialized hardware, a laptop computer, a desktop computer, a personal digital assistant, or other device having text storage and display capability. Once started, the algorithm's SET VALUES step 302 sets the values of variables StraightLineDistance and RunningLength equal to zero, and makes an initial pen setting of FinePoint. The first point of the stroke is read at step 303. The system then waits a preset period of time during which the pointing device is used to extend the length of the stroke. The present period is set so that a reasonable sampling may be performed on the stroke as it is being made. In setting the length of the period, average user stroke speed is taken into account, as is the maximum length of strokes used for handwritten characters. After waiting the preset period, a new point, which is the latest position point of the pointing device is read at step 304. At step 305, a determination is made whether the new point is the same as the previous point. If it is, the user has probably failed to use the pointing device correctly, so the algorithm is terminated at 306. If the new point is not the same as the previous point, a line is drawn from the previous point to the new point using the current pen setting at step 307. At step 308, the distance between the new point and the first point is calculated as the value StraightLineDistance. At step 309, the distance between the new point and the previous point is added to the value RunningLength. At step 310, a determination is made as to whether the value RunningLength is less than 100 pixels. If it is less, it is assumed that a handwritten character is in the process of being written. Thus the FinePoint pen setting is retained and the algorithm returns to step 304 to read a new point. Heuristically, a minimum distance of 100 pixels has been determined to be a workable figure to distinguish highlighting strokes from short handwriting strokes. A distance of 100 pixels is about two or three times the expected maximum stroke length required for a handwritten character. If the minimum If the value RunningLength is at least 100 pixels, a determination is made in step 311 as to whether the value RunningLength divided by the value StraightLineDistance is greater than 1.1. If it is, it is assumed that the user intends that the stroke be non-linear and the algorithm returns to step 304 to read a new point. If the value RunningLength divided by the value StraightLineDistance is 1.1 or less, linearity of the stroke is assumed and the pen setting is changed to highlighter in step 312. In step 313, the entire line is redrawn with the highlighter tool. The algorithm then returns to step 304 to read a new point in the stroke. When the stroke is complete, the answer to the determination in step 305 will be "yes" and the algorithm will end in at step 306.

Certain enhancements have been added to the writing tool selection algorithm in FIG. 4. Rather than having the algorithm end at step 306, the process flow is continued to FIG. 4 and step 401, which makes a determination as to whether or not a stroke has been drawn. If not, the algorithm terminates at step 409. However, if a stroke has been drawn, a determination is made in step 402 as to whether the user intended the stroke to be vertical. If a positive determination of verticality is made, it is assumed that the stroke is a shortcut vertical highlighting stroke, such as stroke 25 of FIG. 2, so the Highlighter tool is selected in step 406 and the entire line is redrawn in step 405. On the other hand, if it is determined that verticality is not intended, a determination is made in step 403 as to whether the user intended the stroke to be horizontal. If it is determined that horizontality is not intended, the FinePoint writing pen tool is selected in step 407. Such a stroke might be diagonal. Diagonal strokes such as stroke 24 might be used to cross out portions of text. A determination of intended verticality or horizontality can be made if the stroke fits within preset parameters for verticality or horizontality. For example, a positive determination may be made if the stroke is within five degrees (plus or minus) of being perfectly orthogonal (i.e., perfectly vertical or perfectly horizontal). If a positive determination of intended horizontality is made in step 403, a further determination is made as to whether or not the stroke is superimposed on a text line in step 404. If yes, this is an almost certain indication that the Highlighter tool should be selected in step 406. The entire line is then completely redrawn with the Highlighter tool in step 405. Optionally, the highlighting stroke can be conformed to make it completely straight and center it on the highlighted text. On the other hand, if the stroke is not superimposed on a displayed text line, the writing pen tool is selected 407 and the entire line is redrawn in step 408 with the FinePoint pen tool. A more or less horizontal stroke not superimposed on a text line might be used to both physically and logically interconnect handwriting strokes with text identified in a central portion of the displayed text. For example, connection might be made to an encircling stroke if the logical connection with the handwritten text is not clear because of excessive clutter on the page or screen. Once the line has been redrawn, the algorithm is terminated in step 409.

As can be readily appreciated, the logic flow chart is cable of successfully implementing the selection method which is designed to assist a reader/editor with the highlighting, annotating and editing of electronically stored and displayable documents. The selection algorithm may be adjusted to best fit the users writing and editing style.

Although only a single embodiment of the invention has been heretofore described, it will be obvious to those having ordinary skill in the art that changes and modifications may be made thereto without departing from the scope and the spirit of the invention as hereinafter claimed.

What is claimed is:

1. In combination with an electronic reading/annotation device, a method for automatically selecting between an electronic writing pen tool used for handwriting tasks and an electronic marker tool used for highlighting tasks, said method comprising the steps of:
   determining whether a user-made stroke was intended to be linear;
   selecting the marker tool if a positive determination of intended linearity is made; and
   selecting the pen tool if a negative determination of intended linearity is made.

2. The method of claim 1, wherein the step of determining is accomplished by the following steps:
   calculating the length of at least a portion of the stroke, said portion of the stroke having a starting point and an ending point;
   calculating the length of a straight line segment from said starting point to said ending point; and
   determining whether a ratio of the length of said portion of said stroke to the length of said straight line segment falls within an established tolerance parameter.

3. The method of claim 2, wherein said tolerance parameter for said ratio is no more than about 110 per cent.

4. The method of claim 2, wherein the highlighter tool is not selected unless the length of a straight line between said starting and ending points exceeds an established minimum straight-line distance.

5. The method of claim 4, wherein said minimum distance is a about 100 pixels.

6. The method of claim 5, wherein the comparison of actual stroke length to straight-line length is made online.

7. In combination with an electronic reading/annotation device having a graphic display screen, a method for automatically selecting between an electronic writing pen tool used for handwriting and/or drawing tasks and an electronic marker tool used for highlighting tasks, said method comprising the following sequence of steps:
   (a) determining whether a user-made stroke made with a pointing device on the display screen exceeds a fixed minimum distance;
   (b) selecting the pen tool if the stroke does not exceed the fixed minimum distance;
   (c) determining whether said user-made stroke was intended to be linear;
   (d) selecting the marker tool if a positive determination of intended linearity is made and the user-made stroke exceeds the fixed minimum distance; and
   (e) selecting the pen tool if the user-made stroke exceeds the fixed minimum distance and a negative determination of intended linearity is made.

8. The method of claim 7, wherein said fixed minimum distance is about 100 pixels.

9. The method of claim 7, wherein said fixed minimum distance is at least double the expected maximum stroke length required for any handwritten character.

10. The method of claim 7, wherein the comparison of actual stroke length to straight-line length is made as soon as actual stroke length exceeds said fixed minimum distance, rather than when the stroke is complete.

11. The method of claim 7, wherein the step of determining whether linearity is intended is accomplished by the following steps:
    calculating the length of at least a portion of the stroke, said portion of the stroke having a starting point and an ending point;
    calculating the length of a straight line segment from said starting point to said ending point; and
    determining whether a ratio of the length of said portion of said stroke to the length of said straight line segment falls within an established tolerance parameter.

12. The method of claim 11, wherein said tolerance parameter for said ratio is no more than about 110 per cent.

13. The method of claim 7, wherein the marker tool is selected if the user-made stroke is within a fixed number of degrees from being perpendicular to lines of text displayed on the display screen.

14. The method of claim 13, wherein about five degrees from true perpendicularity is set as a maximum tolerance for near-perpendicularity.

15. The method of claim 8, wherein the marker tool is selected only if the user-made stroke is within a fixed number of degrees of being parallel to lines of text displayed on the display screen.

16. The method of claim 15, wherein said fixed number is set at about five degrees from parallel.

17. The method of claim 7, wherein the marker tool is selected only if the user-made stroke is within a fixed number of degrees from being parallel to lines of text displayed on the display screen and the stroke is superimposed on a line of displayed text.

18. The method of claim 7, wherein a portion of the stroke is checked for intended linearity before said stroke has been completed, with the marker tool being provisionally selected if intended linearity exists, and the stroke is rechecked for intended linearity when complete, with the marker tool selection being retained only if the intended linearity is still determined to exist.

19. In combination with an electronic reading/annotation device having a graphic display screen, a method for automatically selecting between an electronic writing pen tool used for handwriting and/or drawing tasks and an electronic marker tool used for highlighting tasks, said method comprising the following sequence of steps:
    (a) detecting the initiation of a user-made stroke with a pointing device on the display screen;
    (b) reading the first point of said stroke;
    (c) waiting a preset period of time while the user continues said stroke;
    (d) reading the latest point of the stroke at the end of said preset period;

(e) determining whether or not the latest read point is different from the immediately prior read point;

(f) terminating the method if the latest read point and the previously read point are the same;

(g) calculating both a running stroke length and a straight-line distance from the first stored point to the latest-stored point if the latest stored point and the immediately prior stored point are different;

(h) determining whether or not the stroke, from the first point to the last read point, exceeds a preset minimum distance;

(i) returning to step (c) if the stroke is less than the preset minimum distance;

(j) determining whether said user-made stroke is intended to be linear;

(k) selecting the marker tool if a positive determination of intended linearity is made; and (l) selecting the pen tool if a negative determination of intended linearity is made.

20. The method of claim 19, which further comprises the steps of:

(a) determining whether the stroke, if intended to be linear, is also intended to be vertical;

(b) selecting the highlighter marker if a positive determination of intended verticality is made;

(c) determining whether the stroke, if intended to be linear but not intended to be vertical, is intended to be horizontal;

(d) selecting the writing pen tool if the stroke is intended to be linear, but not intended to be either vertical or horizontal;

(e) determining whether or not the stroke, if intended to be both linear and horizontal, is superimposed on a displayed text line;

(f) selecting the highlighter tool if the stroke is intended to be both linear and horizontal and is superimposed on a displayed text line; and (g) selecting the writing pen tool if the stroke segment is intended to be linear and horizontal, but is not superimposed on a displayed text line.

21. The method of claim 20 wherein said preset minimum distance is selected from the group consisting of the straight line distance from the first point to the last made point and the running stroke length.

* * * * *